United States Patent [19]
Ehrens

[11] 3,763,722
[45] Oct. 9, 1973

[54] GRIPPING AND PULLING TOOL FOR RETRACTING GUIDE TAPES FROM CONDUIT WHILE PULLING ELECTRICAL WIRES INTO THE CONDUIT

[76] Inventor: Rudolph D. Ehrens, 1301 Cooley Rd., Woodburn, Oreg. 97071

[22] Filed: Dec. 21, 1971

[21] Appl. No.: 210,318

[52] U.S. Cl.................. 81/3 J, 81/406, 81/341, 254/134.3 FT
[51] Int. Cl..... B25b 7/04, B25b 25/00, B65h 59/28
[58] Field of Search................ 81/3 J, 5.1 R, 406; 254/134.3 FT; 24/134 KC, 134 R

[56] References Cited
UNITED STATES PATENTS

| | | | |
|---|---|---|---|
| 2,238,386 | 4/1941 | Frank | 24/134 R |
| 2,607,095 | 8/1952 | Maasdam | 81/3 J |
| 2,598,146 | 5/1952 | Tays | 81/3 J |
| 1,206,199 | 11/1916 | Blodgie | 81/406 X |
| 1,036,626 | 8/1912 | House | 81/3 J |

Primary Examiner—Granville Y. Custer, Jr.
Assistant Examiner—Roscoe V. Parker
Attorney—Roy E. Mattern, Jr.

[57] ABSTRACT

A guide tape used by an electrician to pull a group of electrical wires through a conduit is held firmly by using this hand tool to grip the guide tape, without damaging it in any way. The body of the tool serves both as a lower hand gripping handle and an upstanding mounting portion. An upper hand gripping pivotal handle is secured by using an adjustable eccentric bushing fastener assembly located in the upstanding mounting portion of the body. This upper hand gripping pivotal handle along its lower edge has a downwardly protruding convex portion spaced a distance away from the location of the eccentric bushing fastener assembly. Secured to the body below the upstanding portion are both a spacer block and a guide plate held by another fastener assembly.

When the handles are pivoted apart, the tool is positioned so the guide tape is orientated in alignment with the lower handle and it rests on the spacer block between the guide plate and the upstanding mounting portion of the body. Upon moving the handles together, the guide tape is held firmly between the handles below the mounting location of the upper handle, and also the guide tape is deflected by convex portion of the upper handle to further enhance the overhaul gripping capability of the hand tool by utilizing the inherent spring action of the steel guide tape.

1 Claim, 4 Drawing Figures

PATENTED OCT 9 1973 3,763,722
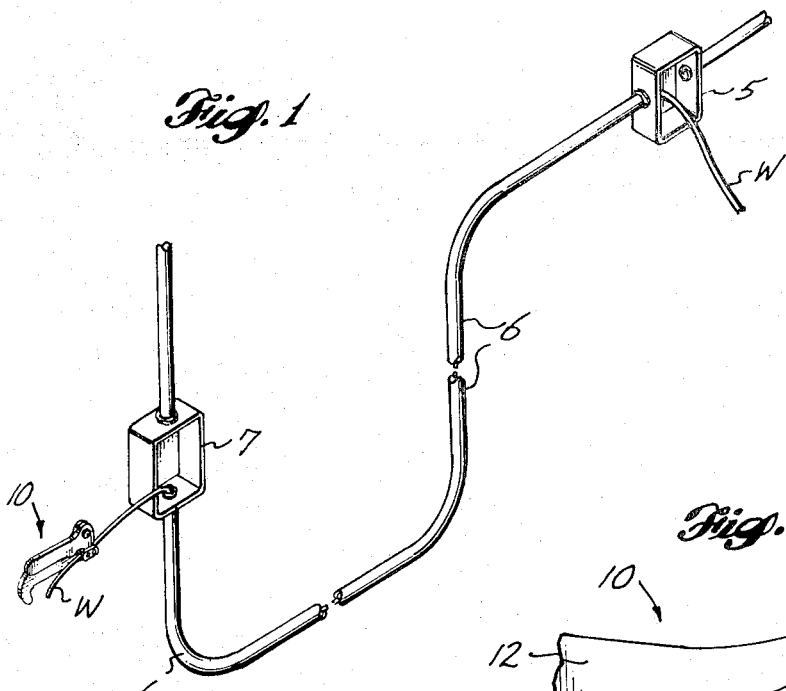
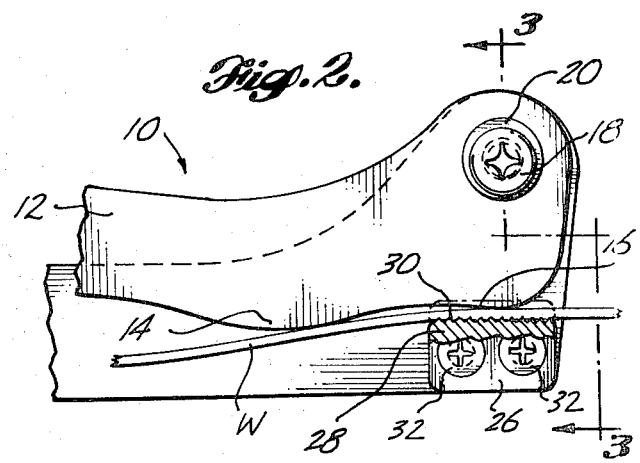
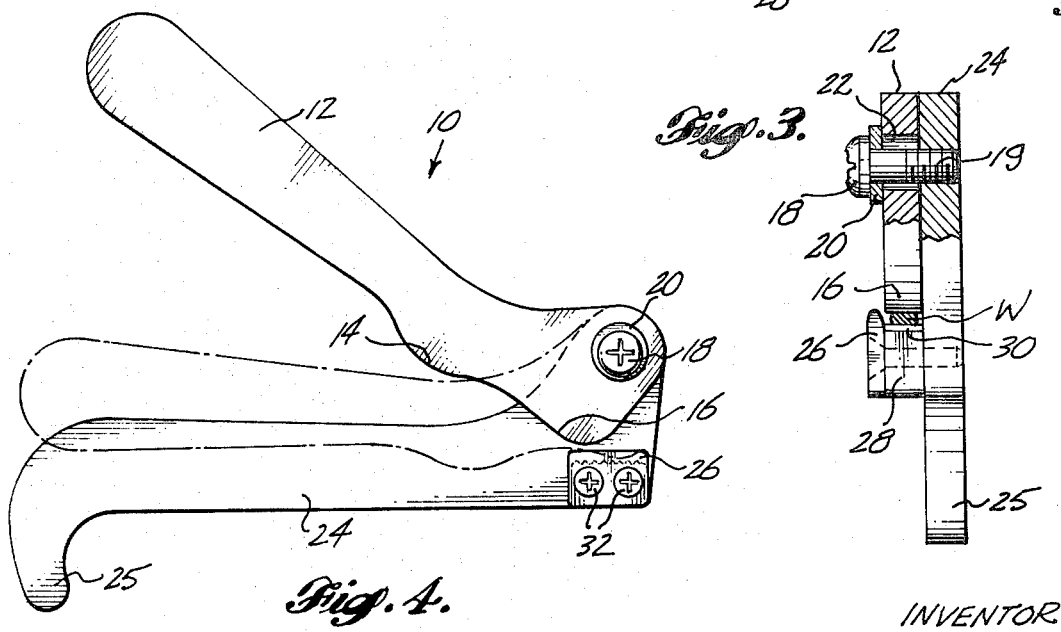
INVENTOR
RUDOLPH D. EHRENS
BY
Roy Mattern Jr.
ATTORNEY

GRIPPING AND PULLING TOOL FOR RETRACTING GUIDE TAPES FROM CONDUIT WHILE PULLING ELECTRICAL WIRES INTO THE CONDUIT

BACKGROUND OF INVENTION

Guide Tapes of spring like steel strips, approximately, 5/16 inch wide and 1/16 inch thick, are first fed through conduits. Then the protruding guide tape end is secured to electrical wires within a common insulator. At this time the guide tape is pulled to guide and to return the guide tape back out through the conduit bringing along the attached electrical wires. The guide tape is reusable and although gripping of it must be positive, damage must not occur. Prior gripping tools have included conventional pliers, often causing damage to the guide tape. Other tools for gripping different types of tapes such as surveyors tapes have not proved satisfactory in use in gripping the spring like steel guide tapes. This gripping and pulling tool securely grips the guide tape without damaging it. When in use it utilizes the inherent spring return force of the guide tape to enhance the pulling tool grip on guide tape.

SUMMARY OF INVENTION

A hand tool, upon pivoting action of its handles, grips steel guide tapes used by electricians, so the guide tapes may be pulled back out of conduit without damaging the guide tapes as electrical wires, often in cable assemblies, are drawn through the conduit. The hand tool uses both a lever-gripping force and a deflection force to provide an overall holding force on the steel guide tape when the hand tool is used to also create the pulling force. The hand tool has adjustable features such as its eccentric bushing mounting of the upper handle and also the interchangeable combination of the spacer block and guide plate, which are all arranged to quickly adapt the hand tool to larger or smaller guide tapes.

DRAWINGS OF THE PREFERRED EMBODIMENT

FIG. 1 is a partial perspective view of an electrician's guide tape previously inserted in a conduit and then being pulled out, using the hand tool, to guide electrical wires through the conduit;

FIG. 2 is a partial side view of the hand tool, with portions broken away, to illustrate how the guide tape is gripped by the handle portions of the tool and also deflected by the upper handle to enhance the holding power;

FIG. 3 is a sectional view taken on line 3—3 of FIG. 2, to indicate the eccentric bushing mounting of the upper handle, and also to indicate the positioning of the guide tape below the upper handle and on the spacer block between the guide plate and the body, the latter also serving as the lower handle and mounting portion for the upper handle; and FIG. 4 is a side view of the tool, showing the upper handle raised in preparation for receiving the electrician's guide tape, with dotted lines indicating the lower position of this upper handle.

DESCRIPTION OF PREFERRED EMBODIMENT

Typical Place of Use

As illustrated in FIG. 1, the use of protective conduit 6 in and around buildings, both above and below ground, requires a convenient method be used later in guiding the electrical wires, often bundled in one or more cables through the earlier installed protective conduit 6. Previously, guide tapes W of spring like steel strips have been used. However, subsequent to their ready insertion and joining with electrical wires, the pulling force is often quite large, which is thereafter required to pull out the guide tape W from the conduit and to pull in electrical wires to occupy the conduit. The guide tape W, initially, and the electrical wires, subsequently, must often undergo directional changes such as occur at electrical boxes 5 and 7 and wherever the conduit 6 itself is curved, as illustrated in FIG. 1. Therefore, there is a need for a gripping and pulling device 10 to apply a strong force to a guide tape W during its removal from a conduit 6, as electrical wires are guided and pulled into the conduit 6.

Gripping and Pulling Tool

A hand gripping and pulling tool 10, used as shown in FIG. 1, to grip electrician's guide tapes W or guide wires, is illustrated further throughout FIGS. 2, 3, and 4. It is designed to snuggly grip the guide tape W without damaging it. This is undertaken by gripping the tape W in one location and thereafter at a spaced location deflecting the tape sufficiently to enhance and to supplement the initial gripping action.

A body 24 of the tool 10 serves as the lower handle 25 of hand gripping size. Also it serves as a mounting structure having an upstanding portion to receive a fastening assembly of a bolt 18 having threads 19 received in a threaded hole in this upstanding portion. Around the bolt near its head is a eccentric bushing 22 which also fits a hole in the upper handle 12. The bushing 20 extends very slightly beyond the hole in the handle 12 to provide a very slight clearance, thereby avoiding any excessive frictional binding of the upper handle 12 when bolt 18 is tightened. As shown in FIG. 3, using a washer 20, bushing 22 is held in place after it is eccentrically positioned and the bolt 18 is tightened to hold the upper handle 12 in a pivotal position adjacent the upstanding portion of body 24.

As illustrated in FIGS. 2 and 3, by adjustment of this eccentricity, the clearance between the upper handle 12 and portions secured to lower handle 25 is adjustable at the principal gripping location, which is located below this pivotal connection of the upper handle 12. The portions secured to the body 24 or to the lower handle 25, are a spacer block 28, having a roughened surface 30, and an adjacent guide plate 26, which are all secured by using a pair of fastening assemblies 32. The block 28 and guide 26 are interchangeable with others to accommodate guide tapes W of other crossectional sizes.

To enhance the overall gripping action to allow a sufficient pulling force to be applied without having any slippage occur, the upper handle 12 is shaped along its lower edge with downwardly orientated convex structures 14, 16. One such convex structure 16, located at the guide tape gripping locale, concentrates the gripping forces below the eccentric mounting place of the upper handle 12. The other such convex structure 14 is located at a spaced distance along upper handle 12 from the location of the application of the concentrated gripping forces. As illustrated in FIGS. 2 and 4, when the upper handle 12 is moved toward the lower handle 25 to create the gripping action, the guide tape W is deflected slightly because of the contact made by the downwardly orientated convex structure 14 on handle 12. Such deflection enhances the gripping action occurring at the convex structure 16. As a consequence, the sum total of the overall gripping actions is sufficient to prevent slippage of the hand tool 10 relative to guide tape W at any time when a pulling force is being applied, provided the handles 12 and 25 are firmly held together.

Convenient Handling, Use, Adjustment, Repair and Storage of the Grip-Pull Tool

This grip-pull tool 10 is compactly arranged for convenient handling, use and active storage on one's tool belt, in one's large pocket, and/or in one's tool box. Upon raising of the upper handle 12, the tool 10 is laterally moved conveniently toward a guide tape W and thereafter upon lowering the upper handle, the gripping is undertaken. Pulling then is undertaken and a depending portion of handle 25 aids in serving as a reactive structure as the gripping handle pulls the tool 10 to move guide tape W and the electrical wires with respect to the interior of conduit 6.

Adjustments are readily made to accommodate different cross sectional shapes of guide tapes W. The eccentric mounting bushing 22 of the upper handle 12 may be rearranged quickly. Likewise, different sizes of spacer blocks 28 and/or guide plates 26 may be interchanged in a short time.

All of these conveniences are provided without detracting from the principal purpose of firmly gripping and then pulling the guide tape without slipping and without causing a damage to the guide tape. In so doing, time is also saved, and injuries to workmen are avoided, which might otherwise result from an unexpected slippage.

I claim:

1. A hand tool for frictionally gripping and pulling an electrician's guide tape, to which electrical wires are attached for guidance into and through and out of conduits, without damaging the guide tape or the electrical wires, comprising:
    a. a body elongated in one major direction to serve as a lower handle, having at a pulling end a depending portion to react against hand pulling forces, having at an opposite gripping end a raised portion to serve as a pivotal mounting place for an upper handle, and to serve as receiving structure to position supporting, gripping and guiding structures, for the electrician's guide tape, to be positioned below the upper handle under its pivotal mounting;
    b. an upper handle, substantially as long as the body, pivotally mounted to the body using an adjustable eccentric mounting means to regulate the downward position of the upper handle, during the gripping of an electrician's guide tape, and having two well spaced downwardly orientated convex integral structures, one convex structure being located below the pivotal adjustable eccentric mounting means of the upper handle to thereby concentrate a gripping force applied to a guide tape at this location, and another convex structure located a spaced distance away along the upper handle to deflect the guide tape, to thereby enhance the overall non damaging gripping function of the tool; and
    c. supporting, gripping, and guiding structures secured with fasteners to the body to position an electrician's guide tape beneath the upper handle during the gripping and pulling operations, undertaken as the upper handle is pivoted toward the lower handle formed by the body and then the two handles while held together are pulled to in turn pull the electrician's guide tape, and upon their release, position change, regripping, and release, time after time no damage of the electrician's guide tape ever occurs because of these gripping and pulling sequences.

* * * * *